Patented Oct. 28, 1952

2,615,799

UNITED STATES PATENT OFFICE 2,615,799

DIESEL FUEL

Edward J. Martin, Homewood, Ill., assignor to Sinclair Refining Company, New York, N. Y., a corporation of Maine No Drawing. Application April 3, 1948,
Serial No. 18,859

2 Claims. (Cl. 44—57)

My invention deals with petroleum oil fractions and blends having a boiling range intermediate that of kerosene and lubricating oils. It is especially significant as applied to diesel oils and I shall particularly described it in that connection.

In order to meet pour point specifications, it is frequently necessary to incorporate in diesel oils, materials known as "pour depressors." A highly effective class of pour depressors is represented by a group of synthetic resins derived by the polymerization of esters of acrylic and methacrylic acids. Another group of materials in common use as pour depressors consists of condensates of aromatic hydrocarbons, especially polycyclic aromatic hydrocarbons as naphthalene and anthracene, and high molecular weight paraffin hydrocarbons, dehydrogenated paraffin hydrocarbons or halogenated paraffin hydrocarbons.

One disadvantage of the acrylic resins not shared by resins of the condensation type is their adverse effect on the cetane value of the diesel oil. Thus, it is found upon incorporation of the acrylic resin in the oil that the cetane number is thereby reduced to about the same extent as it is increased when a resin of the condensation type is employed as the depressor.

I have discovered that when an extraneous hydrocarbon wax is added to the diesel oil along with the acrylic resin, the expected reduction in cetane value does not occur; in fact, the cetane value of the oil is normally increased. I have further discovered that the addition of the extraneous wax operates to markedly enhance the effectiveness of the resin in depressing the pour point of the oil. Thus, by means of my invention a lower pour point can be achieved with a given amount of depressor or, conversely, a given pour point specification can be met with less depressor.

In the practice of my invention I may use waxes of various melting points and from various sources. In general, amorphous waxes, e. g. petrolatum, give better results than crystalline waxes, but the latter, whether derived from petroleum or a native paraffin wax, e. g. ozocerite, are applicable.

The proportion of extraneous wax added varies depending on its nature and on the characteristics of the oil and depressor. It is also influenced, of course, by the pour point specification to be met. Usually the optimum crystalline wax concentration is less than the optimum petrolatum concentration. Thus, in one experiment involving a typical diesel fuel boiling within the range 390° F.–700° F., the optimum crystalline wax concentration, using 0.05% depressor, was found to be .03% as against 0.6% for petrolatum, all percentages being on the weight of the oil. At 0.03% petrolatum concentration the improvements were much less marked than in the case of the crystalline wax at such concentration, but greatest improvement in the respect of both pour point and cetane value was achieved at 0.6–1.0% petrolatum concentration. In general, the concentrations of depressor and wax may be said to lie within the ranges: 0.005–2.0% and 0.005–1.5%, respectively.

The wax may be incorporated in the oil either before or after the pour depressor is added or it may be dissolved in the depressor in the desired proportion and the resulting solution added to the oil. The waxes applicable to the practice of my invention are, in general, highly soluble in depressors of the acrylic type.

My invention is further illustrated by the following examples which are not to be taken as in any way limiting the scope thereof:

Example I

A diesel fuel was made up by blending 75% by volume of a gas oil with 25% of kerosene. The characteristics of the two oils used to produce the blend are given below together with the characteristics of the blend.

|  | Gas Oil | Kerosene | Diesel Fuel 75% Gas Oil+25% Kerosene |
|---|---|---|---|
| Gravity | 35.2 | 42.4 | 36.7 |
| Flash | 137 | 164 | |
| V./100 (C. S.) | 4.08 | 1.86 | |
| Pour, ° F | +14 | −40 | +8 |
| C. C. | 0.01 | 0.01 | |
| Ash | 0.0 | 0.0 | |
| Color | 1½− | 1− | |
| Cloud, ° F | 20 | 20 | 20 |
| 100 cc. Dist., percent: | | | |
| 10 ° F | 517 | 411 | 466 |
| 20 ° F | 533 | 420 | 483 |
| 30 ° F | 543 | 428 | 502 |
| 40 ° F | 560 | 435 | 525 |
| 50 ° F | 572 | 442 | 544 |
| 60 ° F | 588 | 450 | 564 |
| 70 ° F | 605 | 459 | 586 |
| 80 ° F | 622 | 470 | 611 |
| 90 ° F | 652 | 487 | 642 |
| E. P. ° F | 718 | 505 | 695 |
| Cetane | | | 53.8 |

"Acryloid 150," a standard, oil-soluble acrylic-type pour depressor was added to samples of the blend in varied amounts. "Acryloid 150" is a partially polymerized ester of alpha methacrylic acid and monohydric aliphatic saturated alcohols. The alcohols are predominately lauryl alcohol and are derived from coconut oil. The polymerizate is a clear viscous concentrate of the methacrylic polymer in a high grade solvent, and the concentrate is characterized by the following properties:

| | |
|---|---:|
| Gravity, °API | 27 |
| Viscosity, SUS, at 100° F | 27000 |
| Viscosity, SUS, at 210° F | 2800 |

0.15% of the depressor (on the weight of the blend) reduced the pour point to −12° F., while 1.0% gave a pour point of −22° F. Using 0.6% petrolatum, a pour point of −12° F. was achieved with only 0.01% depressor. The same amount of petrolatum with 1.0% Acryloid gave a pour of −40° F., 18 degrees lower than that obtained with 1.0% Acryloid alone. The cetane numbers of the samples containing 0.15% and 1.0% Acryloid was 53.6 and 53.0, respectively, whereas the cetane number was 54.0 in the case of both of the petrolatum-containing samples. Thus, the petrolatum operated to increase the cetane number to a point above that of the blend free of additives.

The petrolatum employed in these tests had the following characteristics:

| | |
|---|---|
| Gravity | 31.4 |
| Flash | 535 |
| Fire | 610 |
| V 210 | 84.0 |
| Color | Dark (NPA) |
| Melting point | 147.2° F. (PMP) |

*Example II*

In this instance, the diesel fuel, representing a mixture of 75% gas oil and 25% of a water-white distillate, had a pour point of +4° and a boiling range of from 392° F. to 711° F. 0.125% of the acrylic depressor (Acryloid) reduced the pour point to −10° F. while 0.225% gave a pour point of −15° F. The same reductions in pour point were achieved with only 0.008% and 0.0125%, respectively, of the depressor through the addition of 0.6% petrolatum. The minimum pour point obtained from the depressor alone was −20° F. at 0.03% concentration. The addition of 0.6% petrolatum further lowered the pour point to −44° F. In all cases, the depressor when used alone reduced the cetane value, but the reduction was more than restored by the petrolatum.

Numerically, the increase in cetane number, which follows from incorporation of the wax in the fuel, is small but it has a noticeably beneficial effect on the ignition qualities of the fuel. A description of the cetane test will be found as A. S. T. M. Designation: D 613—43T, on page 228 of the A. S. T. M. Standards on Petroleum Products and Lubricants, December 1946 issue. By "pour point," as used herein, I, of course, refer to the temperature at which the oil after chilling to a solid or semi-solid state will start to flow.

As indicated hereinbefore, my invention is not limited to diesel fuels but may be applied to other petroleum oil fractions boiling, for the most part, within the range 450° F.–700° F. Thus, it is within the scope of my invention to reduce the pour point of wax-containing furnace oils by the method described.

This application is a continuation-in-part of my application Serial No. 728,717, filed February 14, 1947, now abandoned.

I claim:

1. A diesel fuel containing from about 0.005% to about 2% of a pour depressor of a viscous, oil-soluble polymerization product of esters of alpha methacrylic acid and monohydric aliphatic saturated alcohols which are predominantly lauryl alcohols, and from about 0.005% to about 1.5% of an extraneous hydrocarbon wax selected from the group consisting of amorphous and crystalline waxes, and having a cetane value at least equivalent to that of the diesel fuel free of additives.

2. A diesel fuel containing from about 0.005% to about 2% of a pour depressor of a viscous, oil-soluble polymerization product of esters of alpha methacrylic acid and monohydric aliphatic saturated alcohols which are predominantly lauryl alcohols, and from about 0.005% to about 1.5% of petrolatum and having a cetane value at least equivalent to that of the diesel fuel free of additives.

EDWARD J. MARTIN.

REFERENCES CITED

The following references are of record in the file of this patent:

UNITED STATES PATENTS

| Number | Name | Date |
|---|---|---|
| 2,091,627 | Bruson | Aug. 31, 1937 |
| 2,100,993 | Bruson | Nov. 30, 1937 |
| 2,125,875 | Barnard | Aug. 9, 1938 |
| 2,177,732 | MacLaren | Oct. 31, 1939 |
| 2,403,267 | Davis | July 2, 1946 |